(No Model.)
H. B. GOWEN.
ATTACHMENT FOR PLOWS.
No. 393,151. Patented Nov. 20, 1888.
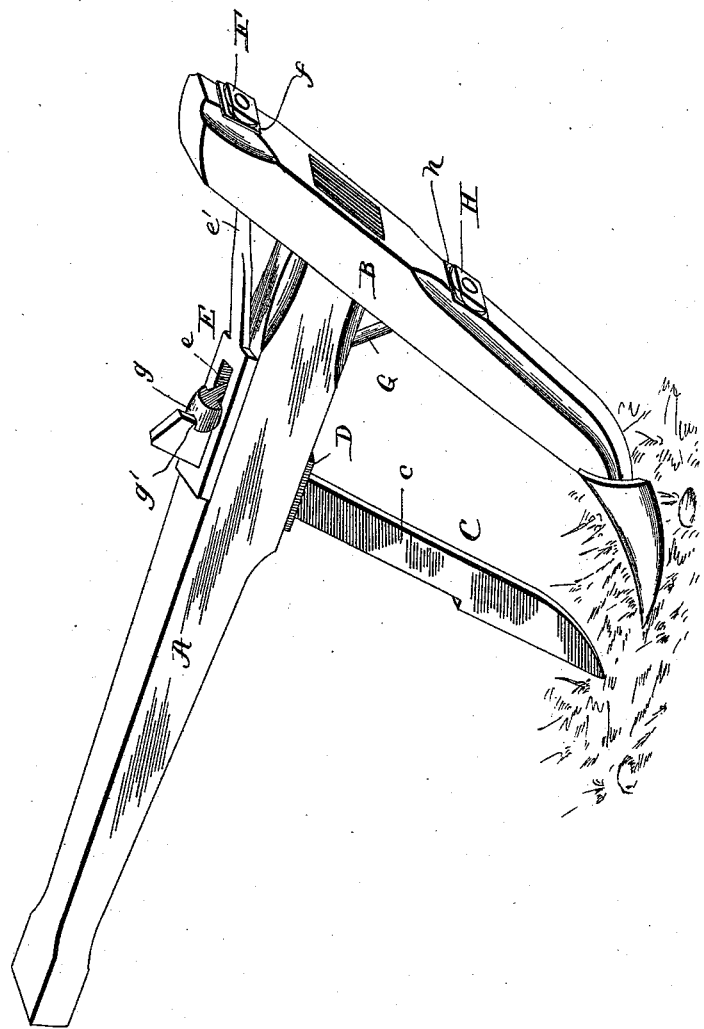
Witnesses.
Frank S. Ober.
Inventor,
H. B. Gowen,
By his Attorneys

United States Patent Office.

HAYWORD BENTON GOWEN, OF HARRISON, MISSISSIPPI, ASSIGNOR OF ONE-HALF TO JAMES R. LONG, OF SAME PLACE.

ATTACHMENT FOR PLOWS.

SPECIFICATION forming part of Letters Patent No. 393,151, dated November 20, 1888.

Application filed May 17, 1888. Serial No. 274,140. (No model.)

*To all whom it may concern:*

Be it known that I, HAYWORD BENTON GOWEN, a citizen of the United States, residing at Harrison, in the county of Tallahatchie and State of Mississippi, have invented new and useful Improvements in Attachments to Plows, of which the following is a specification.

The invention relates to improvements in plows; and it consists in the construction and novel combination of the devices and attachments by means of which the colter is secured to the plow-beam, as hereinafter described, illustrated in the drawing, and pointed out in the claim hereto appended.

In the drawing the figure represents a perspective view of a plow, looking downward and from the rear.

Referring to the drawing by letter, A designates the plow-beam, and B the standard secured to the rear end thereof, inclining downward and forward and having a plowshare of ordinary construction attached to its lower end. The plow-handles, which may be of any desired construction, are purposely omitted from the drawing, in order to show more clearly the parts that constitute the invention.

C is the colter, provided with the shank $c$, which extends upward and rearward through the opening made for its reception in the plow-beam, and D is a metal plate secured to the lower surface of the plow-beam and provided with an opening of equal size to and registering with the lower orifice of the shank-opening in the beam.

E is the binding-bar for the colter-shank, which bar has its front portion widened and provided with a rectangular longitudinal slot, $e$, through which the extension of the colter-shank above the plow-beam passes. The shank of said bar passes rearward and slightly upward, and its rear rounded portion, $e'$, extends through a suitable opening in the extension of the plow-standard above the beam and has its end threaded to engage the nut F, the inner corners of which are beveled to turn easily in the concave seat of the washer $f$ between the said nut and standard.

G is a brace and support bar having a head, $g$, that rests upon the upper surface of the widened portion of the binding-bar, and is preferably, but not necessarily, provided with a notch, $g'$, in its front side to form a seat for the rear edge of the colter-shank. From the head $g$ the shank of the brace-bar extends downward and rearward through the slot $e$ and through suitable openings in the plow beam and standard, and has its end rounded and threaded in rear of the latter to engage the nut H, having its inner corners beveled to turn easily in the concave seat of the metal washer $h$ between said nut and standard.

It is evident that by turning up the nut F the binding-bar will be drawn rearward and against the head $g$ of the brace-bar, and the colter will be thus held in place. It is also evident that by turning up the nut H the standard will be more firmly braced on the plow-beam. To adjust the colter higher or lower, loosen the said two nuts, slip the colter-shank up or down to the desired position, and then tighten up the nuts again.

The widened portion of the binding-bar, the plate D, and the washers $f$ $h$ serve as wear-plates to preserve the beam and standard.

In order to remove the colter it is necessary simply to loosen the nut on the end of the binding-bar, so that the said bar can be pushed forward, thereby releasing the colter. By tightening the nuts so as to draw the binding-bar and brace-bar toward and through the standard the colter can be given a greater pitch.

Having described my invention, I claim—

The combination, with the beam and the standard, of the colter passing through the beam, the binding-bar having its front end enlarged and provided with a longitudinal slot, through which the upper end of the colter projects, and having its rear end projected through the upper end of the standard and provided with a securing-nut, and a brace-bar passing through the beam and having its upper end projected through the slot in the binding-bar, and provided with a head having a notch to receive the back edge of the colter, and having its lower end projected through the standard and provided with a securing-nut, as set forth.

In testimony that I claim the foregoing as my own I have hereto affixed my signature in presence of two witnesses.

HAYWORD BENTON GOWEN.

Witnesses:
MOORE MOORE,
JACOB KUYKENDALL.